(12) United States Patent
Khawand et al.

(10) Patent No.: US 7,366,532 B2
(45) Date of Patent: Apr. 29, 2008

(54) GROUP CALL MANAGEMENT THROUGH RECEIVE/TRANSMIT SYNCHRONIZATION

(75) Inventors: Charbel Khawand, Miami, FL (US); Bin Liu, Weston, FL (US); Jianping W. Miller, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 840 days.

(21) Appl. No.: 10/682,772

(22) Filed: Oct. 9, 2003

(65) Prior Publication Data

US 2005/0079883 A1 Apr. 14, 2005

(51) Int. Cl.
*H04B 7/01* (2006.01)
(52) U.S. Cl. .............. 455/502; 455/13.2; 455/519; 455/500
(58) Field of Classification Search ........ 455/502, 455/416, 415, 13.2, 518, 519, 446, 500, 434, 455/71, 88; 370/310, 337, 343
See application file for complete search history.

(56) References Cited

U.S. PATENT DOCUMENTS

| | | | | |
|---|---|---|---|---|
| 5,086,507 A | * | 2/1992 | Mela | 455/509 |
| 5,130,987 A | * | 7/1992 | Flammer | 370/436 |
| 5,699,353 A | * | 12/1997 | Kent | 370/315 |
| 5,913,171 A | * | 6/1999 | Solonen et al. | 455/502 |
| 5,960,362 A | * | 9/1999 | Grob et al. | 455/527 |
| 5,978,367 A | * | 11/1999 | Kinnunen et al. | 370/337 |
| 6,366,572 B1 | * | 4/2002 | Esterberg et al. | 370/343 |
| 2003/0065729 A1 | | 4/2003 | Leinonen | |
| 2003/0065783 A1 | | 4/2003 | Hertling et al. | |
| 2003/0065788 A1 | | 4/2003 | Salomaki | |
| 2006/0269019 A1 | * | 11/2006 | Simmons et al. | 375/343 |

* cited by examiner

Primary Examiner—Tan Trinh

(57) ABSTRACT

A method of communicating with a transceiver (120). In one arrangement, the method of communicating with the transceiver can be performed in a systemless group environment. Synchronization information (150) can be received from a mobile transceiver (110) and used to synchronize to the mobile transceiver. The synchronization information can include a timing offset and a frequency offset. Synchronization can be maintained until a predetermined condition is met, for example, a predetermined amount of group inactivity.

13 Claims, 3 Drawing Sheets

GROUP CALL MANAGEMENT THROUGH RECEIVE/TRANSMIT SYNCHRONIZATION

CROSS-REFERENCE TO RELATED APPLICATIONS

Not applicable

FIELD OF THE INVENTION

This invention relates to wireless communication protocols, and more particularly to transmission synchronization among multiple wireless transceivers.

BACKGROUND OF THE INVENTION

Wireless transceivers, such as mobile communication devices, sometimes use a half duplex mode of communication. Using the half duplex mode, a wireless transceiver can transmit and receive, but cannot simultaneously do both. When multiple wireless transceivers are communicating in a group environment, one or more wireless transceivers can receive a signal transmitted by another wireless transceiver. It is desirable, however, that only one transceiver transmit at any given time to avoid transmission collisions. Transmission collisions can disrupt communications. In a communication system that has a central controller, such as a base radio station, the central controller typically provides a timing signal to keep the transceivers synchronized, thereby preventing transmission collisions from occurring.

In a systemless call environment, that is a call environment that does not have a central controller such as a basestation, the wireless transceivers typically are required to synchronize with each other at the start of each transmission. This synchronization process consumes time and power, thus reducing battery life. Moreover, in group calls, there remains an issue of which member in the group is granted the group channel for transmission. Oftentimes, wireless transceivers participating in a group call transmit at random. Thus, transmission collisions sometimes occur and multiple synchronization signals are sometimes generated. When multiple synchronizations are generated, some members participating in a group may synchronize with a particular transceiver, while others may synchronize with another transceiver. In consequence, the group can be divided into multiple subgroups with each subgroup having its own synchronization. Thus, no effective and efficient method appears to exist for providing synchronization between wireless transceivers participating in a group call when a central controller is not available.

SUMMARY OF THE INVENTION

An embodiment in accordance with the present invention relates to a method of communicating with a transceiver. In one arrangement, the method of communicating with a transceiver is performed in a systemless group environment. Synchronization information can be received from a mobile transceiver and used to synchronize to the mobile transceiver. The synchronization information can include a timing offset and a frequency offset. Synchronization can be maintained until a predetermined condition is met, for example, a predetermined amount of group inactivity.

The method also can include the step of transmitting a transmission request. The transmission request can include a preamble being transmitted in a time slot synchronized with the mobile transceiver. The transmission request also can include synchronization information. A synchronized time slot can be randomly selected for transmitting the transmission request.

The method also can include the steps of transmitting synchronization information to at least one transceiver and maintaining synchronization with the transceiver until a predetermined condition is met, such as a predetermined amount of group inactivity. The synchronization information can include a timing offset and a frequency offset. Further, a transmission request comprising a preamble can be received from the transceiver. The transmission request can be received in a synchronous time slot.

The method also can include the step of transmitting synchronization information to a second transceiver, the synchronization information establishing group synchronization with the second transceiver. The synchronization information can be transmitted to the second transceiver after the step of transmitting synchronization information to the at least one transceiver. For example, the second transceiver can be a transceiver not already synchronized to the group.

DETAILED DESCRIPTION OF THE DRAWINGS

An embodiment in accordance with the present invention relates to a method and an apparatus that facilitates synchronization between wireless transceivers in, for example, a systemless group call environment. In particular, a first transceiver can transmit synchronization information in one or more frames to other members of a group. In the case that the transceivers operate using a frequency hopping-spread spectrum (FH-SS) protocol, the synchronization information can specify a time offset and a frequency hopping seed that can be used by the other members of the group to remain synchronized to the first transceiver. The transceivers can remain synchronized in this manner until a predetermined condition is met. For example, synchronization can be maintained until no group activity has been detected for a predetermined amount of hang time. As defined herein, hang time is the period of time that a group maintains synchronization during group inactivity, i.e. no further group activity is detected. For example, the hang time can be a time period of six seconds following the termination of a transmission within the group. Importantly, if another device in the group begins transmitting before the hang time expires, the group can maintain the established synchronization until another period of group inactivity is detected which exceeds the hang time. It is understood, however, that group inactivity for a predetermined amount of time is not the only predetermined condition for maintaining synchronization.

Figure 1:
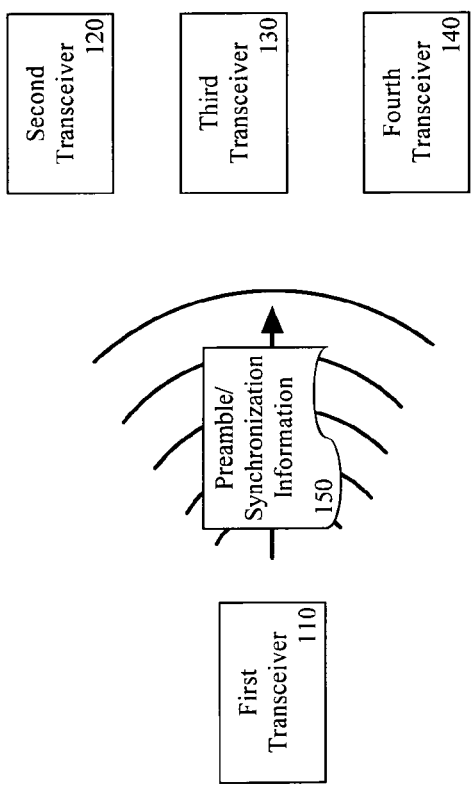
FIG. 1 is an exemplary schematic diagram of a wireless call group in accordance with the inventive arrangements disclosed herein.

Referring to FIG. 1, an exemplary group 100 of wireless transceivers (transceivers) is shown. The group 100 can comprise any plurality of transceivers. For example, the group 100 can include a first transceiver 110, a second transceiver 120, a third transceiver 130 and a fourth transceiver 140. The transceivers 110, 120, 130, 140 can be transceivers which transmit and receive RF communication data. For example the transceivers 110, 120, 130, 140 can be mobile transceivers, such as mobile radios, cellular telephones or any other mobile communication device. The transceivers can support full duplex or half duplex communications services.

In operation, if no other transceivers within the group are transmitting, the transceivers 110, 120, 130, 140 can be in a scan mode wherein the transceivers 110, 120, 130, 140 scan for preambles transmitted by another transceiver. When it is desired for the first transceiver 110 to establish a call within the group, the first transceiver 110 can transmit a transmission request comprising a preamble and synchronization information 150. The transceivers 120, 130, 140 can detect the preamble and use the synchronization information to synchronize to the first transceiver 110.

Figure 2:
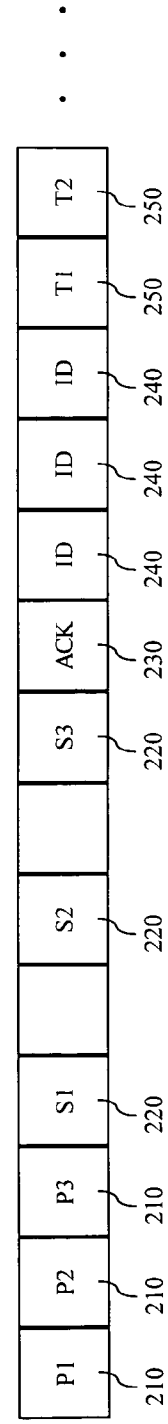
FIG. 2 is an exemplary frame sequence representing an exchange between a transmitting wireless transceiver and a receiving wireless transceiver in accordance with the inventive arrangements disclosed herein.

Referring to FIG. 2, a frame sequence 200 is shown which represents frames exchanged between the transceiver 110 (transmitter), and transceivers 120, 130, 140 (receivers) when a call is established. The transmitter can begin the sequence by transmitting preambles 210. The preambles 210 can be tones transmitted at specific RF frequencies which can be detected by the receivers. The preambles 210 can be used to synchronize the transmission timing between the transmitter and the receivers. For example, in the case that the transceivers operate using a FH-SS protocol, the preambles 210 can be used to determine a frequency hopping set.

A plurality of preambles 210 can be transmitted, each at a different predetermined frequency. In the present example three preambles 210 can be transmitted. A receiver can continue to scan the predetermined frequencies for the preambles 210 until one of the preambles 210 is detected. For example, if the frequencies at which a first and a second preamble are transmitted are in use, a receiver may not detect the first and second preambles. However, the receiver may detect a third preamble if the frequency at which the third preamble is being transmitted is not in use by another transmitting device.

Once a preamble 210 is detected, the receiver can scan for an associated synchronization frame 220 generated by the transmitter. The synchronization frame 220 can be used by the receiver to synchronize timing and frequency with the transmitter. There can be a synchronization frame 220 transmitted on each frequency at which a preamble 210 is transmitted. Thus, as with the preamble detection, if the frequencies at which a first and a second synchronization frame are transmitted are in use, a receiver may not detect the first and second synchronization frames. However, the receiver may detect a third synchronization frame if the frequency at which the third synchronization frame is being transmitted is not in use by another transmitting device.

The synchronization frames 220 can comprise a private identification, a group identification, and other information. In the case that the transceivers operate using a SS-FH protocol, the synchronization frames can contain a time offset and a frequency hopping seed. The frequency hopping seed can be an initial value which is used in a random number generator to generate new communication frequencies which can be used by the transmitter and receiver to communicate. To insure the transmitter and receiver remained synchronized, the transmitter and receiver can use the same random number generating algorithm. The time offset can identify time slots when transceivers within the group which are attempting to establish a call can transmit preambles and synchronization frames.

After receiving a synchronization frame, the receiver can transmit an acknowledgement (ACK) frame 230 to the transmitter, which signals the transmitter that the receiver is ready to receive data. After receiving the ACK frame 230, the transmitter can transmit identification frames 240 and voice/data frames 250. The identification frames 240 can contain caller identification information. The voice/data frames 250 can contain voice and/or data.

Figure 3:
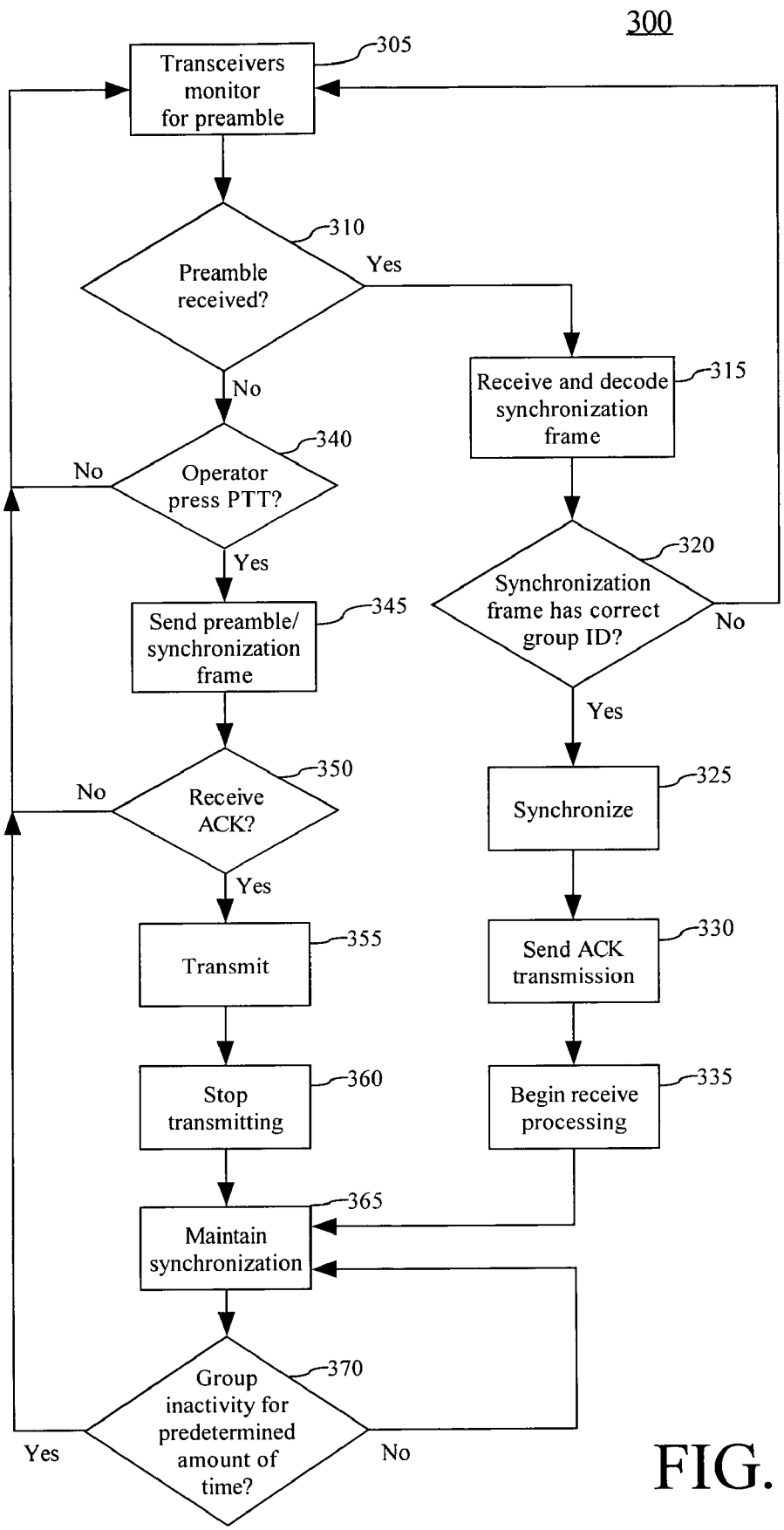
FIG. 3 is a flow chart illustrating a method of providing group call management through receive/transmit synchronization in accordance with the inventive arrangements disclosed herein.

An exemplary flow chart 300 illustrating a method of providing group call management through receive/transmit synchronization is shown in FIG. 3. Beginning at step 305, a transceiver in a call group can monitor for a preamble. Referring to decision box 310 and step 315, if a preamble is received, the transceiver can receive and decode a synchronization frame associated with the preamble. As noted, within the synchronization frame is a group identification. The group identification identifies with which group the transmitting device is associated. Referring to decision box 320, if the group identification does not match the group to which the transceiver is associated, the transceiver can continue monitoring for preambles. If the synchronization frame does contain the correct group identification, however, the transceiver can synchronize to the transmitting device, as shown in step 325, and send an acknowledgement (ACK) transmission, as shown in step 330. The transceiver then can begin receive processing, as shown in step 335. Proceeding to step 365 and decision box 370, the transceiver can maintain synchronization until there has been no group activity detected for a predetermined amount of hang time. Once the hang time expires and there has been no group activity for the predetermined amount of time, the transceiver can again begin monitoring for preambles, as shown in step 305.

Referring to step 340, if a transceiver is not in the receive mode and an operator of the transceiver pushes a press-to-talk button (PTT) button on the transceiver, the transceiver can transmit a transmission request comprising a preamble and a synchronization frame. In the case that the transceiver is not already synchronized to a group, the synchronization frame can contain synchronization information which can be used to establish group synchronization. This can be the case if the call group hang time has expired or the transceiver is joining the group after the initial synchronization. In the case that the transceiver is joining the group after the initial synchronization, the other members can re-synchronize to the new transceiver, so long as another transceiver within the call group is not currently transmitting.

If, however, the transceiver is an original group member and is already synchronized to the group, the synchronization information can be commensurate with the synchronization pattern already established for the group. As noted, the preamble and synchronization frame can be transmitted in time slots which are synchronous with the group. Notably, the exact synchronous time slots that are used to transmit the preambles and synchronization frames can be randomly selected. For example, if two members of a group simultaneously depress a PTT button on respective transceivers, each transceiver can randomly select synchronous time slots in which to transmit. Such random time slot selection significantly reduces the risk of two transceivers transmitting preambles/synchronization frames in the same time slot, which is commonly known as a transmission collision.

Notably, the synchronization information can be used by transceivers attempting to join and synchronize to the group. For example, if a group call is in progress, and a new transceiver having the same group identification is switched on or enters the broadcast range of a transmitting transceiver within the group, the new transceiver can detect the preamble and synchronization frame being transmitted by a transmitting transceiver. The preamble and synchronization frame can be used by the new transceiver to synchronize to the group.

Referring to decision box 350, if the transceiver receives an ACK from another device, the receiver can begin its transmission sequence, as shown in step 355. Proceeding to steps 360 and 365, the transceiver can stop transmitting when the transmission sequence is complete and maintain synchronization with the group. Referring to decision box 370, once there has been no group activity for the predetermined amount of time, the transceiver can again begin monitoring for preambles, as shown in step 305.

Figure 4:
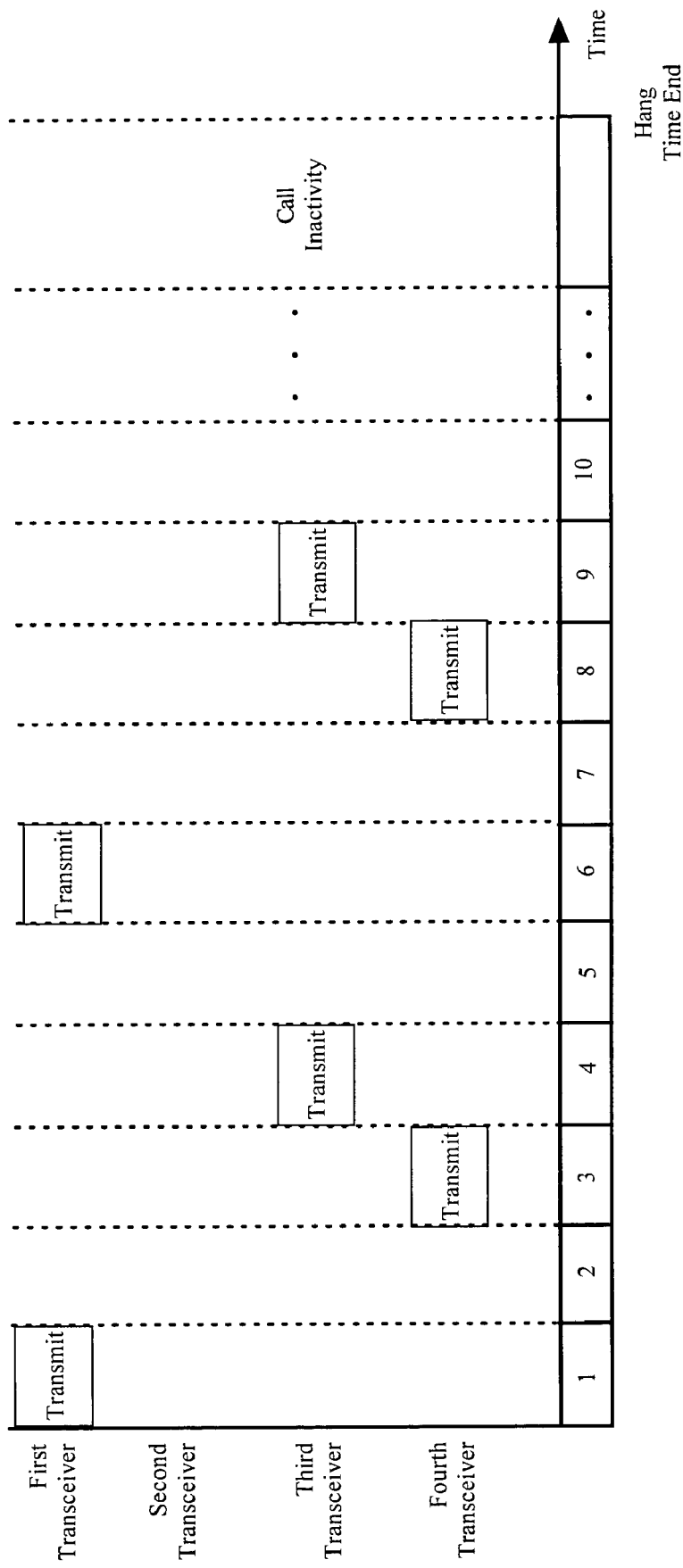
FIG. 4 is an exemplary transmit timing diagram in accordance with the inventive arrangements disclosed herein.

Referring to FIG. 4, an exemplary timing diagram 400 is shown which illustrates random time slot selection for preamble and synchronization frame transmissions. Assume, for example, that the first, second, third and fourth transceivers are synchronized, the hang time has not expired, and a PTT button is simultaneously depressed on the first, third and fourth transceivers. Each of the three transceivers then can transmit a preamble and synchronization frame in random synchronous time slots, as noted. In the example, the first transceiver has randomly selected the first and sixth time slots, the third transceiver has selected the fourth and ninth time slots, and the fourth transceiver has selected the third and eighth time slots. If the second transceiver detects the first transceiver's preamble and synchronization frame which are transmitted in the first time slot, the second transceiver can send an ACK to the first transceiver and begin receiving transmissions. Since the second transceiver has already responded to the first transceiver, the second transceiver can ignore the third and fourth transceivers. Accordingly, the third and fourth transceivers will not receive an ACK. After a predetermined number of preamble/synchronization frames have been transmitted and no ACK has been received, the third and fourth transceivers can switch to a scan mode to begin monitoring for a preamble transmitted by another device, such as the first transceiver. Upon receiving the preamble/synchronization frames from the first transceiver, the third and fourth transceivers then can send an ACK and begin receiving transmissions from the first transceiver. Again, synchronization can be maintained until there has been no group activity for the predetermined period of time.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims. For example, the present invention is not limited to a systemless group environment as the invention can be practiced with systems including base stations or any other fixed network equipment.

What is claimed is:

1. A method of communicating with a transceiver comprising the steps of:
   in a systemless group environment, receiving synchronization information from a mobile transceiver that is part of a group;
   synchronizing to the mobile transceiver using the synchronization information; and
   maintaining synchronization with the mobile transceiver until no group activity has been detected for a predetermined time period following the termination of a transmission within the group such that if another device in the group begins transmitting before the predetermined time period expires, the group maintains the established synchronization until another period of group inactivity is detected that exceeds the predetermined amount of time.

2. The method according to claim 1, wherein said receiving synchronization information step comprises receiving a timing offset and a frequency offset.

3. The method according to claim 1, further comprising the step of transmitting a transmission request comprising a preamble, the transmission request being transmitted in a time slot synchronized with the mobile transceiver.

4. The method according to claim 3, wherein the transmission request further comprises synchronization information.

5. The method according to claim 3, further comprising the step of randomly selecting the synchronized time slot.

6. A method of communicating with a transceiver comprising the steps of:
   in a systemless group environment, transmitting synchronization information to a plurality of transceivers, the synchronization information establishing group synchronization with the plurality of transceivers to form a group; and
   maintaining synchronization with the plurality of transceivers until no group activity has been detected for a predetermined time period following the termination of a transmission within the group such that if one of the transceivers in the group begins another transmission before the predetermined time period expires, the group maintains the established synchronization until another period of group inactivity is detected that exceeds the predetermined amount of time.

7. The method according to claim 6, wherein said transmitting synchronization information step comprises transmitting a timing offset and a frequency offset.

8. The method according to claim 6, further comprising the step of:
   receiving a transmission request the transmission request comprising a preamble and the transmission request being received in a synchronous time slot.

9. The method according to claim 8, wherein the transmission request further comprises synchronization information.

10. The method according to claim 6, wherein said step of transmitting synchronization information to a plurality of transceivers further comprises transmitting synchronization to a new transceiver that is part of the group.

11. A machine-readable storage, having stored thereon a computer program having a plurality of code sections executable by a machine for causing the machine to perform the steps of:
    in a systemless group environment, receiving synchronization information from a mobile transceiver that is part of a group;
    synchronizing to the mobile transceiver using the synchronization information; and
    maintaining synchronization with the mobile transceiver until no group activity has been detected for a predetermined time period following the termination of a transmission within the group such that if another device in the group begins transmitting before the predetermined time period expires, the group maintains the established synchronization until another period of group inactivity is detected that exceeds the predetermined amount of time.

12. The machine readable storage of claim 11, further comprising the step of transmitting a transmission request comprising a preamble, the transmission request being transmitted in a time slot synchronized with the mobile transceiver.

13. A machine-readable storage, having stored thereon a computer program having a plurality of code sections executable by a machine for causing the machine to perform the steps of:

in a systemless group environment, transmitting synchronization information to a plurality of transceivers, the synchronization information establishing group synchronization with the plurality of transceivers to form a group; and maintaining synchronization with the plurality of transceivers until no group activity has been detected for a predetermined time period following the termination of a transmission within the group such that if one of the transceivers in the group begins another transmission before the predetermined time period expires, the group maintains the established synchronization until another period of group inactivity is detected that exceeds the predetermined amount of time.

* * * * *